Dec. 13, 1949  F. H. BOGART  2,491,358
MACHINE TOOL
Filed Sept. 9, 1946  5 Sheets-Sheet 1

INVENTOR.
Fred H. Bogart
BY
Kwis, Hudson, Boughton & Williams
ATTORNEYS

Dec. 13, 1949     F. H. BOGART     2,491,358
MACHINE TOOL
Filed Sept. 9, 1946     5 Sheets-Sheet 2
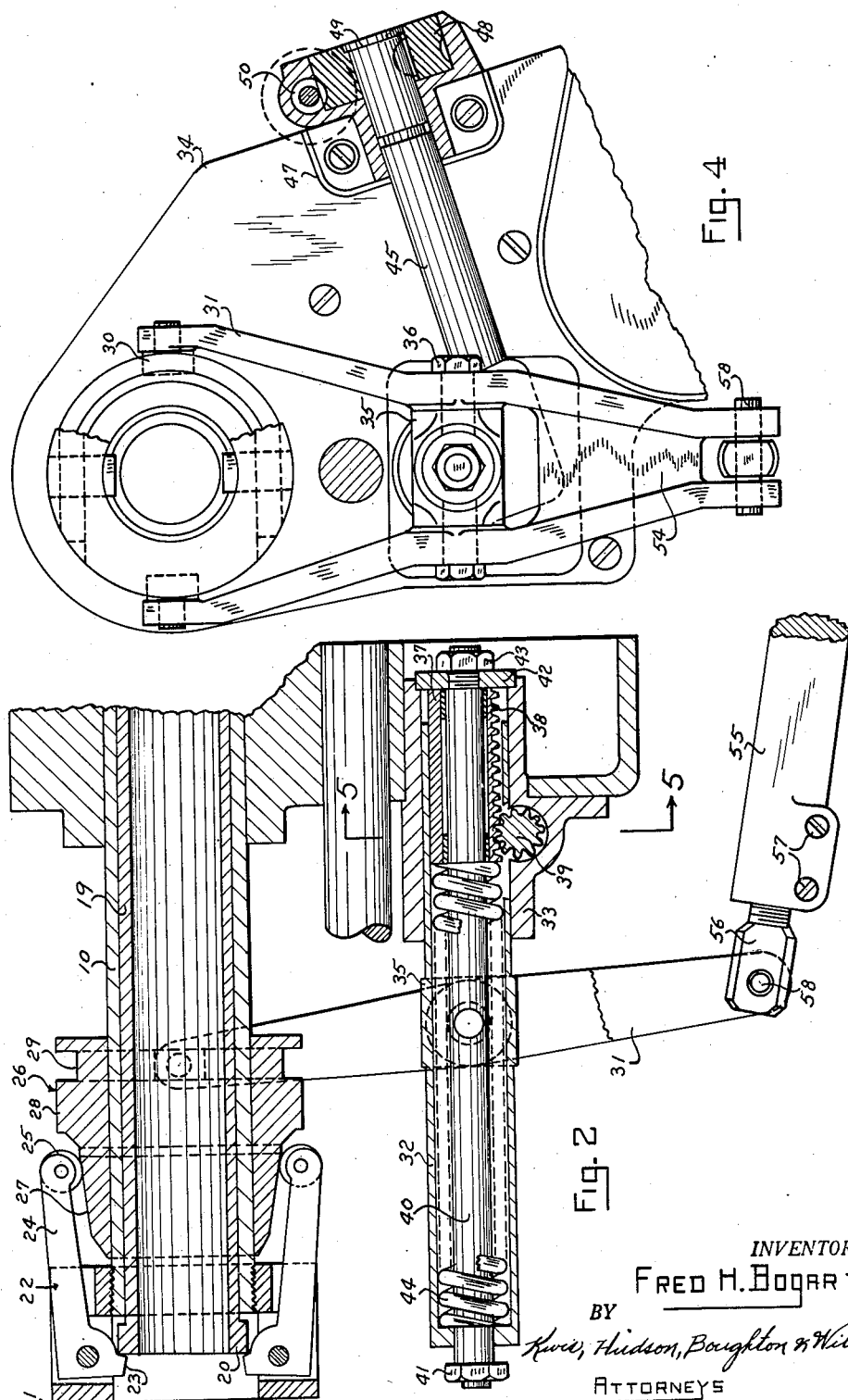
INVENTOR.
FRED H. BOGART
BY
Kwis, Hudson, Boughton & Williams
ATTORNEYS Dec. 13, 1949   F. H. BOGART   2,491,358
MACHINE TOOL
Filed Sept. 9, 1946   5 Sheets-Sheet 3

INVENTOR.
FRED H. BOGART
BY
Kwis, Hudson, Boughton & Williams
ATTORNEYS

Dec. 13, 1949  F. H. BOGART  2,491,358
MACHINE TOOL
Filed Sept. 9, 1946  5 Sheets-Sheet 4

INVENTOR.
FRED H. BOGART
BY
Kwis, Hudson, Boughton & Williams
ATTORNEYS

Dec. 13, 1949     F. H. BOGART     2,491,358
MACHINE TOOL

Filed Sept. 9, 1946     5 Sheets-Sheet 5

INVENTOR.
FRED H. BOGART
BY
Kwis, Hudson, Boughton & Williams
ATTORNEYS

Patented Dec. 13, 1949

2,491,358

UNITED STATES PATENT OFFICE 2,491,358

MACHINE TOOL

Fred H. Bogart, South Euclid, Ohio, assignor to The Warner & Swasey Company, Cleveland, Ohio, a corporation of Ohio Application September 9, 1946, Serial No. 695,595

7 Claims. (Cl. 279—1)

This invention relates to a machine tool and more particularly to the collet chuck operating mechanism of a bar working machine tool.

In the operation of bar working machine tools, the operator adjusts the chuck actuating mechanism in accordance with the diameter of the bar stock to be gripped by the chuck. Although the bar stock used in the chucks of such machine tools is of a specified diameter, such bar stock is customarily furnished with certain tolerances; that is, the individual lengths of the bar stock may vary in diameter a number of thousandths of an inch over or under the specified diameter. If the operator of the machine tool should take from the supply pile a length of bar stock which, for example, happened to be of minimum diameter, he would adjust the chuck actuating mechanism to have the chuck properly grip such bar of stock. Then should he subsequently position in the chuck another bar of stock from the supply pile which, for example, happened to be of maximum diameter, the various parts of the conventional chuck actuating mechanism cannot be moved by the operator to fully closed or stop gripping position due to the previous adjustment of such mechanism for gripping the minimum diameter of the stock.

It may, therefore, be necessary to adjust the mechanism of a conventional collet chuck for nearly every piece of stock selected. If the operator should attempt to apply additional force to cause the parts to move to a complete stock gripping position, without readjusting the mechanism when the stock is oversize, there is a likelihood that some of the parts of the chuck actuating mechanism will be damaged, bent or broken. The danger of damaging the parts of the conventional chuck actuating mechanism is present in the manual operation of such mechanism, since experience shows that operators will persist in forcing the parts, even though they have been warned against applying excessive force to manually close the chuck. Such danger is present to a greater degree where the chuck actuating mechanism includes a power arrangement for closing the chuck; for example, an arrangement such as is shown in my copending application, Serial No. 548,829, filed August 10, 1944, now Patent No. 2,476,693, granted August 19, 1949. This necessity of frequently readjusting the chuck actuating mechanism for different diameters of stock requires the time of the operator, increases the idle time of the machine tool, and thus lessens its efficient operation.

An object of the invention is to provide, in a machine tool, an improved collet chuck actuating mechanism adapted to be either manually or power operated and which, when once adjusted for an intermediate diameter of stock within a wide range of tolerance limits, does not have to be readjusted for any diameter of stock between the minimum and maximum of such tolerance limits and yet will effect work gripping with a substantially predetermined pressure and without danger of damaging the mechanism.

Another object of the invention is to provide, in a machine tool, an improved collet chuck actuating mechanism which includes means for applying a yieldable force to a portion of the actuating mechanism to permit work or stock of various diameters within a wide range of tolerance limits to be firmly gripped with a substantially uniform predetermined pressure.

It is also an object of the invention to provide an improved collet chuck actuating mechanism which includes a pivoted actuated lever and means for applying a yieldable force to the lever whereby work or stock of various diameters within a wide range may be firmly gripped with a substantially uniform pressure.

Another object of the invention is to provide an improved collet chuck actuating mechanism which includes a pivoted actuated lever and means to apply a yieldable force to the pivot of said lever to permit work or stock of various diameters within a wide range to be firmly gripped with a substantially uniform pressure, the means for applying the yieldable force being adjustable to provide a range of work-gripping pressures.

A further object of the invention is to provide a collet chuck actuating mechanism for a machine tool which includes operative connections between the operating member and the actuated part of the chuck with a portion of the operative connections forming a toggle, and means cooperating with a portion of the toggle to apply a yieldable force thereto whereby work or stock of various diameters within a wide range may be gripped with a substantially uniform predetermined pressure.

A still further object of the invention is to provide a collet chuck actuating mechanism as defined in the preceding object with means to vary the yieldable force exerted upon the toggle to provide a range of work-gripping pressures.

An additional object of the invention is to provide a collet chuck actuating mechanism including rocking collet-actuating fingers and a cone having a conical surface for rocking the levers, the mechanism including means to enable the cone to be held in work-gripping relationship by a substantially uniform yieldable force with the fingers resting upon any portion of the conical surface of the cone, whereby work or stock of various diameters within a wide range may be gripped with substantially uniform predetermined pressure.

The invention also has as an object the provision of chuck actuating mechanism for a machine tool which improves the efficiency of operation of the tool.

Further and additional objects and advantages not expressly set forth above will become apparent hereinafter from the detailed description of several embodiments of the invention described with reference to the accompanying drawings in which:

Fig. 1 is a longitudinal sectional view through a portion of the work spindle and collet chuck of a machine tool with the preferred embodiment of the improved actuating mechanism for said chuck shown partly in elevation and partly in section, the parts of the actuating mechanism being shown in full lines in the relative positions they occupy when the collet chuck is gripping stock of intermediate size within a range of limits, and in broken lines corresponding to the open or non-gripping position of the chuck;

Fig. 2 is a fragmentary view similar to Fig. 1 showing the relative positions for the parts of the preferred form of the improved chuck actuating mechanism when the chuck is gripping a length of stock of minimum diameter within a range of limits;

Fig. 4 (sheet 2) is an end view looking from the left of Fig. 2 with a portion in section;

Figure 1:
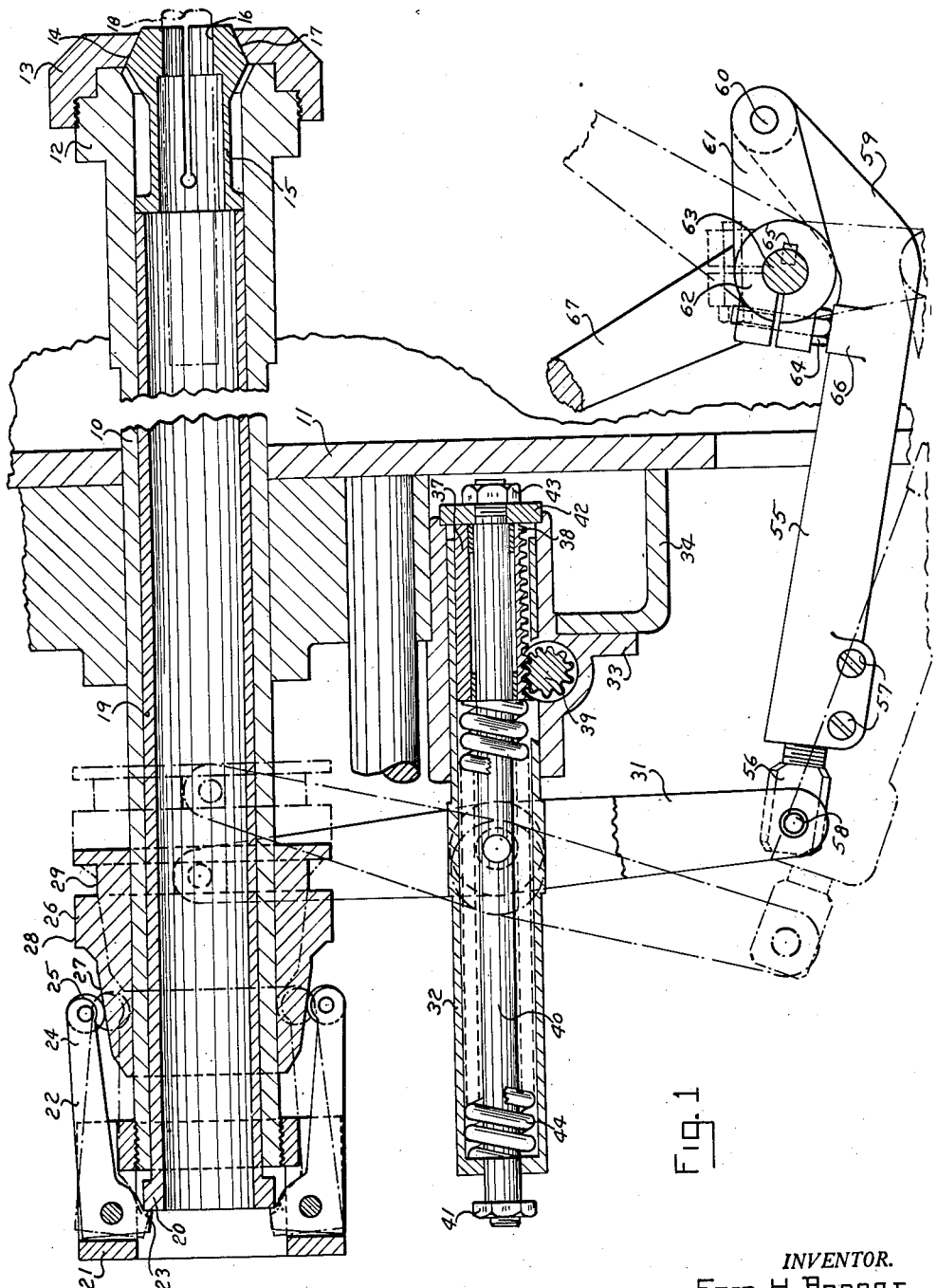

Referring to Fig. 1, reference numeral 10 indicates the hollow work spindle of a bar working machine tool, such as a lathe. It will be understood that the work spindle is rotatably mounted in the headstock 11 of the machine tool and is driven at different speeds through a suitable transmission, not shown. The end of the work spindle, which is adjacent to the cutting tools (i. e., the right-hand end of the spindle as viewed in Fig. 1), is provided with an enlarged nose portion 12 which is externally threaded and on which a hood 13 is screwed. The hood 13 is provided internally with a conical camming surface 14, concentric with the central opening of the hood and with the bore of the spindle for a purpose shortly to be described.

A work-gripping device or collet 15 arranged within the nose 12 and the internal bore of the spindle 10 is provided with a plurality of spring gripping jaws 16 which have external conical camming surfaces 17 cooperating with the camming surface 14 of the hood 13. The collet 15 is slidable axially of the spindle and nose, and when forced towards the right, as viewed in Fig. 1, the conical surface 14 of the hood acts on the conical surfaces 17 of the spring jaws to cam the jaws inwardly into work-gripping engagement with a length of work or bar stock 18, a portion of which is indicated in broken lines as projecting through the collet and into the spindle. As soon as the pressure against the collet is released, the inherent spring action of the jaws, acting through the cooperating cam surfaces, causes the collet bodily to shift to the left with the result that the grip of the jaws on the work or bar stock is released.

In order to shift the collet into work-gripping position, an actuating sleeve 19 is slidably mounted in the bore of the spindle. The right-hand end of the sleeve 19, as viewed in Fig. 1, abuts the collet 15, while the opposite end of the sleeve is provided with an annular shoulder 20 located beyond the end of the spindle and extending into a finger housing 21. The housing 21 is adjustably screwed on to the adjacent end of the spindle so that the housing may be adjusted axially of the spindle and locked in adjusted position by conventional means not shown.

The housing 21 rockably mounts levers 22, which in their entirety will hereafter be designated as fingers. These levers include heel portions 23, engaging the shoulder 20 of the actuating sleeve, and finger portions 24 projecting exteriorly of the housing 21 and carrying rollers 25 at their free ends. An actuated part or shiftable member 26 is slidably mounted on the spindle 10 and includes a conical camming surface 27 and an annular shoulder 28. The shoulder 28 is provided with an annular groove 29, which receives shoes 30 carried by the forked upper ends of a bifurcated actuated lever 31 (see also Fig. 4). The actuated lever 31 is pivotally supported by yieldable means mounted on the frame of the machine tool in a manner to be hereinafter described.

It will now be seen that when the actuated part 26, having the conical surface 27, is moved axially of the spindle towards the left, as viewed in Fig. 1, the said conical surface will be brought into engagement with the rollers 25. This will spread the fingers causing the heel portions 23 thereof to press against the shoulder 20 on the actuating sleeve 19 and thus force the sleeve and the collet 15 towards the right to cam the collet jaws 16 into gripping engagement with the stock 18. In accordance with this invention, the work or stock is firmly gripping with the rollers 25 of fingers 24 resting upon the conical surface 27 of the actuated part. To prevent the actuated part from shifting relative to the fingers in a stock releasing direction when the stock is gripped, this part is held in work-gripping position by a yieldable predetermined force exerted thereon in a manner subsequently described.

The actuated lever 31, as will be seen from Figs. 1 to 4 and as previously mentioned, is bifurcated and is pivoted intermediate its ends upon a hollow member or sleeve 32 slidably received in a boss or bushing 33. This boss or bushing 33 is mounted in a bracket 34, which is in turn attached to the frame 11. The sleeve 32 is provided intermediate its ends with an enlarged portion 35 forming bosses for receiving the ends of pivot pins or studs 36 passing through openings in the forked arms of the lever 31 and received in the said enlarged portion 35, thereby providing a pivot or fulcrum for the lever. Within the inner end of the sleeve 32 is slidably received a normally stationary member 37 which is adapted to be adjusted longitudinally relative to the sleeve. For this purpose the sleeve 37 has rack teeth 38 formed thereon which cooperate with the pinion 39 actuated by mechanism hereinafter described, it being noted that the sleeve 32 has a slotted opening through which the said pinion 39 may project for engagement with the rack teeth 38.

The outer end of the sleeve 32 has an inner shoulder having a central opening for receiving an elongated rod 40, the latter being provided at its outer end with a nut 41 and having its inner end passing through a bore in the member 37. A washer 42 is mounted on a reduced threaded portion of the inner end of rod 40 and is held in firm engagement with a shoulder on the inner end of boss 33 by a nut 43. Disposed within the sleeve 32 is a means for applying a yieldable force to the sleeve, this means being here illustrated as a helical coiled spring 44. The spring 44 is disposed around the rod 40 with one end abutting the inner shoulder of sleeve 32 and its other end abutting the inner end of the member 37, the latter being stationary after having been adjusted to a desired position by means of the pinion 39. The spring 44 therefore acts against the member 37 and the inner shoulder of sleeve 32 and tends to force the latter to the left, as viewed in Figs. 1, 2 and 3, until the said sleeve abuts the nut 41. There is thus provided a yieldable support or mounting for the fulcrum or pivot of the lever 31.

The parts of the yieldable mounting are preferably assembled with the spring 44 loaded or compressed to a predetermined minimum pressure and, after installation, the pressure exerted by the spring may be increased to a predetermined maximum by rotating the pinion 39 in a counterclockwise direction, the maximum force or pressure being exerted when the member 37 has moved to its furthest position to the left as permitted by the length of the rack. The force exerted by the spring 44 determines the gripping pressure exerted by the collet chuck, since the said spring will act on the actuated lever to force the actuated part (i. e., the conical surface 27) to a position in engagement with the rollers 25 of fingers 22, as determined by the pressure exerted by the spring, when the lower end of the lever 31 is moved to the full-line position indicated in Figs. 1, 2 and 3.

Figure 5:
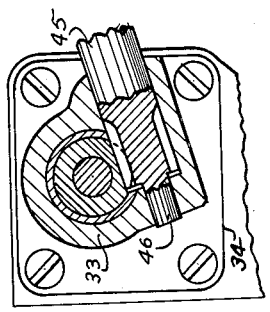
Fig. 5 (sheet 5) is a detached sectional view substantially on the line 5—5 of Fig. 2 and looking in the direction indicated by the arrows.

The adjustment of pinion 39, and hence the compression of spring 44, is effected by a shaft 45 having the pinion 39 connected thereto or integrally formed thereon (see Figs. 4 and 5). The inner end of shaft 45 has a reduced extension 46 which is journalled in a bore so located in the boss 33 that the teeth of the pinion 39 pass through the aforementioned slotted opening in sleeve 32 and engage the rack teeth 38 on the member 37. The shaft 45 extends outwardly of the boss 33 and has its outer end rotatably journalled in a bracket 47 carried by the bracket 34 (see Fig. 4). A worm wheel 48 is keyed or otherwise connected to the outer end of shaft 45, being held in position thereon by a shoulder 49 on the shaft, the worm wheel having its teeth meshing with a worm 50 journalled in the bracket 47 and having its outer end provided with a knurled wheel or knob 51 (see Fig. 6). The thread of the worm and the worm teeth are so shaped as to have a locking cooperation thereby holding an adjusted position without the use of independent locking means. The outer face of the worm wheel 48 is provided with calibrations or indicia indicating the adjusted position of the worm wheel, and hence the pressure exerted by the spring 44, the said calibrations or indicia cooperate with a stationary mark or pointer 53 carried by the bracket 47.

Figure 6:
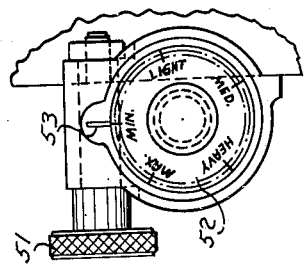
Fig. 6 (sheet 3) is an end view of a detached portion of Fig. 4 looking from the right-hand side thereof.

It will now be observed that by turning the knob 51 the shaft 45 will be rotated, thereby causing the pinion 39 to move the member 37 to vary the compression of the spring 44, the counterclockwise rotation of the pinion 39 increasing the compression and clockwise rotation decreasing the compression. The resulting force exerted by the spring 44 upon the lever 31 is represented by the indicium or calibration 52 which is aligned with the pointer 53. As shown in Fig. 6, the mechanism has been adjusted so that the spring 44 is exerting its minimum pressure.

The lower arms of the bifurcated lever 31 are united by an integral rib 54 to provide a rigid construction, and the said rib is terminated short of the lower branched arms of the lever 31 between which is received one end of an interconnecting member or link 55. This link 55 is preferably provided with means for adjusting its length, this means comprising a projection 56 which has one end pivotally connected with the lower end of lever 31 and its other end threadably received in a slotted, threaded bore of the main portion of the link 55. Hence, the length of the link 55 may be adjusted by threading the portion 56 relative to the main body of the link, the adjustment being maintained by means of locking screws 57, after which the link may be assembled with the lever 31 by passing a pivot pin 58 therethrough.

As will be seen in Fig. 1, the link 55 has its rear end curved, as indicated at 59, and the outer end of this curved portion is provided with a bore for receiving a pivot pin 60 to which is also pivoted a forked link or arm 61, the said curved portion 59 being received between the forked portions of the arm 61. The inner end of arm 61 has an enlarged portion forming a boss 62 provided with a bore, and the said boss 62 is slotted to enable the arm to be firmly clamped to a shaft 63 by means of a screw 64 which draws the two portions of the boss 62 together in clamping engagement about the shaft 63. The boss 62 of arm 61 is also provided with a keyway cooperating with a key 65 provided in the shaft 63 to prevent relative rotation between the shaft and the arm 61. The head of screw 64 also forms an abutment for an enlarged portion or boss 66 on the link 55 to accurately define the relative positions of the link 55 and arm 61 in their actuated relationship.

It will be observed that the length of the link or arm 61 and of the curved portion 59 of link 55 are so selected that, when the head of screw 64 is abutting the boss 66, the said link and arm will form a toggle lock, since a line through the pivot 66 and the pivot pin 58 passes above the center of the shaft 63. Moreover, the length of the link 55 and position of the finger housing 21 are so adjusted that the pivot for lever 31 must shift slightly to the right when the lever passes from its inoperative to its work-gripping position. Therefore, with the parts in the positions illustrated in full lines in Fig. 1, the link 55 is locked against movement so that the pivot pin 58 becomes a fixed pivot point for the actuated lever 31, the upper end of which holds the conical camming surface 27 of the actuated part 26 in engagement with the fingers 22 with a force corresponding with the force exerted on the lever 31 by the spring 44.

The shaft 63 extends forwardly beyond the front face of the headstock of the machine and is provided adjacent its outer end with an operating member 67, which in the present instance may comprise a lever provided with a suitable handle for manual actuation. As previously mentioned, the operating member 67 may also be connected with a power boosting mechanism, such as is fully illustrated and described in my copending application, Serial No. 548,829 mentioned above.

When the actuating member or lever 67 is rocked from its full-line position to its broken-line position, as illustrated in Fig. 1, it will break the toggle lock moving the link 55 and the actuated lever 31 to their respective broken-line positions and thereby shifting the actuated part 26 to its inactive position, likewise represented by broken lines. The natural resiliency of the jaws 16 of the collet 15 will then cause the latter to slide slightly inwardly of the spindle 10 releasing the grip upon the work or stock 18 and causing the sleeve 19 to shift slightly towards the left (as viewed in Fig. 1). This shifting of the sleeve 19 rocks the fingers 22 to their inactive positions, represented by the broken lines, at which time the stock can be freely shifted by mechanism not here illustrated.

Assuming that the housing 21 has been adjusted to a position corresponding to that for stock having a diameter intermediate the range of tolerance limits, as represented by Fig. 1, and that stock having a minimum diameter within the range of tolerance limits is now present in the collet and is to be gripped thereby, the operator will actuate the lever 67 to a position corresponding to that shown in full lines in Fig. 1, thereby rocking the toggle linkage formed by link 55 and arm 61 to a locked position. This will rock the actuated lever 31 to slide the cone 26 to the position illustrated in Fig. 2, thereby rocking the fingers 22 and gripping the stock in the manner previously described. Since the stock is now of minimum size, it will be observed that the fingers occupy a different position upon the surface of the cone than they did for the stock of intermediate size as represented in Fig. 1, and the fulcrum for lever 31 will not shift as much as it did for gripping the stock of intermidate size.

It will be observed that the spring 44 is adjusted for minimum work-gripping pressure and hence the above described actuation of cone 26 results in only a slight movement of the pivot 36 of lever 31. However, if a maximum work-gripping pressure be desired upon the stock, the adjusting knob 51 will be rotated to align the maximum indication 52 with the arrow 53 before the operating lever 67 is operated and while the collet is in its open position. This will result in further compressing the spring 44. When the operating lever 67 is now actuated to rock the toggle linkage to its locking position, the lever 31 will again be rocked to move the conical surface 27 on the actuated part 26 to engage the fingers 22. As this movement occurs, the fulcrum of the lever 31 will now tend to shift again to the right, as indicated in Fig. 1 against the increased spring pressure and said increased pressure will act upon the lever and the cone so that the jaws 16 grip the stock more firmly, the gripping pressure being proportional to the force exerted by the spring. The cone will be held in this position under the predetermined force of the spring 44, the compression of which to its maximum work-gripping pressure, is maintained by the locking action of the worm 50 and the worm wheel 48.

Figure 3:
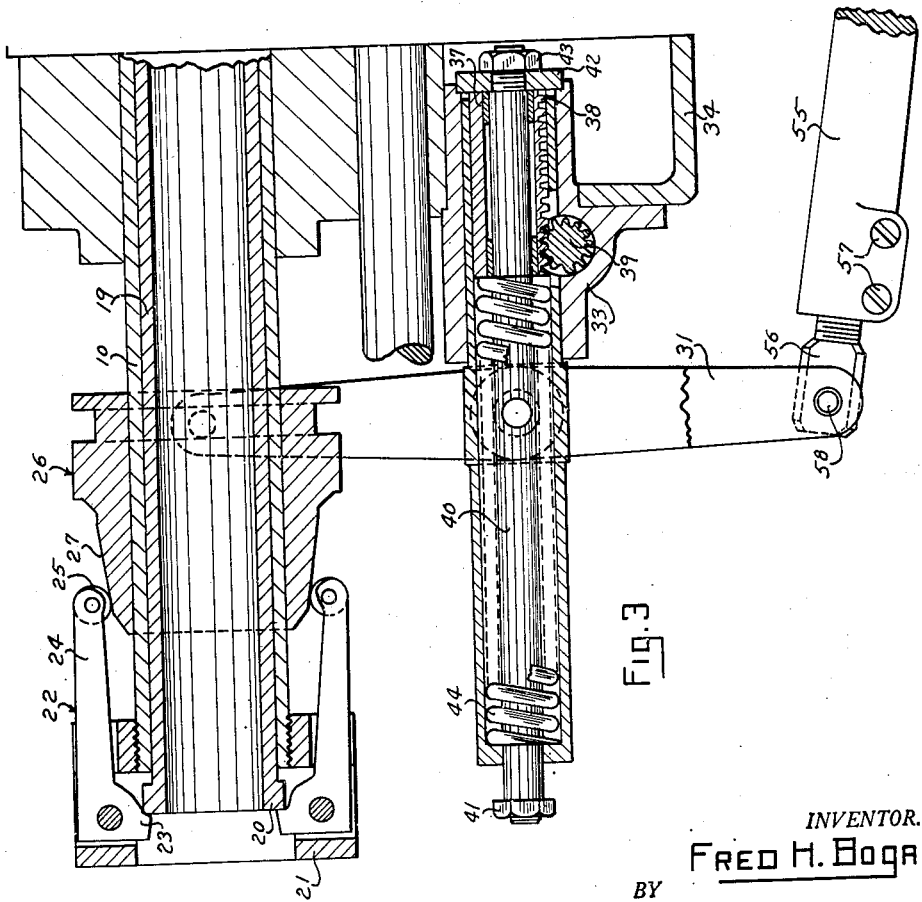
Fig. 3 is a fragmentary view similar to Figs. 1 and 2 but showing the parts of the preferred form of the improved chuck actuating mechanism when the chuck is firmly gripping a length of stock of maximum diameter within a range of limits.

In Fig. 3 there is illustrated the position of the parts of the improved collet chuck actuating mechanism when the stock in the collet is of maximum diameter within the range of tolerance limits and the mechanism is in its work-gripping position. It will be seen that in this instance the rollers 25 on the fingers 22 cannot ride as far up the conical surface 27 as heretofore. Hence, when the toggle linkage is actuated to its locked position, the fulcrum of the lever 31 shifts a slightly greater distance against the action of the spring 44 so that the toggle may be locked as before, the conical surface 27 being held in its work-gripping position by the action of the spring against the lever 31.

To briefly summarize, the preferred embodiment of the invention provides means whereby stock of various diameters within a wide range of tolerance limits may be firmly gripped with a substantially uniform predetermined pressure by the use of a conical finger engaging member, the cone being held in its work-gripping position for each size of stock, with the fingers resting upon the surface of the cone by a yieldable force applied to a portion of the actuating mechanism. Moreover, the yieldable force so applied to the cone may be readily adjusted to provide a range of work-gripping pressures, the work-gripping pressure for which the force is adjusted being indicated to the operator by the indicia 52 and the pointer 53.

Referring now to Figs. 7, 8, 9, and 10, there is illustrated a modified form of collet chuck actuating mechanism embodying the novel features of this invention. The collet chuck here disclosed is the same as that illustrated in Fig. 1 and will, therefore, not be described in detail. Suffice it to note that spindle 10, which is rotatably journalled in the frame 11, has a nose portion 12 to which is threaded a hood 13. The hood 13 has a conical camming surface 14 aligned with a central opening through the hood, and a conventional collet 15 is slidably received within the hollow interior of the spindle 10 and has its jaws 16 projecting into the opening of the hood 13, the said jaws being provided with a conical surface 17 cooperating with the conical camming surface 14 of the hood 13. Likewise, a collet actuating sleeve 19 is slidably mounted within the spindle 10 and has one end abutting the inner end of the collet 15, the other end of the sleeve 19 extending beyond spindle 10 and being provided with an enlarged shoulder 20. A finger carrying housing 21 is threadably engaged with the end of the spindle 10, adjacent the flange 20 on the sleeve 19, and the housing 21 may be locked in adjusted position by means not shown. The housing 21, as before, has rockably mounted therein a plurality of fingers 22 having heel portions 23 engaging the collar or flange 20 on the sleeve 19 and having elongated portions 24 provided at their outer ends with rollers 25.

An actuated part or cone 68 is slidably mounted on the spindle 10 and is provided with a conical surface 69 to engage the fingers 22 and rock the latter for actuating the collet into work-gripping position, as previously described for the preferred embodiment. The actuated part 68 also includes an annular groove 70 for receiving shoes 71 carried on the upper ends of a bifurcated, actuated lever 72. This actuated lever 72 is pivoted at 73 upon a bracket 74 connected to the frame 11, the lever 72 below its fulcrum or pivot 73 being provided with a rib 75. Below the rib 75, the lever 72 is provided with a slot or opening 76 which communicates at its lower end with a longitudinal bore formed in the lower end of the lever, as will be seen from Figs. 8, 9 and 10. A U-shaped link 77 is received in the slot 76 and has one end pivotally connected to the lever 72. The other end of this link 77 straddles and is pivotally connected to one end of the part 78 of a two-part link, the other part of which is indicated at 79. The part 78 of the two-part link has its other end threaded and this threaded end is screwed into a threaded bore formed in the longitudinally slit end of the part 79 so that the two parts can be adjustably interconnected and locked in adjusted position by locking screws 80.

The longitudinal bore in the lower end of the lever 72 slidably receives a hollow plunger or follower 81, which is provided at its upper end with a roller 82. A coiled spring 83 is positioned in the bore with one end of the spring extending into the plunger 81 and with its lower end abutting a plug 84 adjustably screwed into the threaded lower end of the bore for adjusting the compression of the spring and hence the force exerted thereby on the plunger 81. This spring holds the roller 82 in engagement with the lower side of the part 78 of the two-part link, retaining the part 78 and the U-shaped link 31 substantially in the position shown in Fig. 7 when the work gripped is of a minimum diameter within the tolerance limits, it being observed that the link 31 and the part 78 of the two-part link form a toggle through which the force of the spring is multiplied and transmitted to the lever 72.

The right-hand end of the part 79 of the adjustable two-part link is angularly bent upward and is pivotally connected to the forked end of an operating arm or link 85, the other end of which is fixedly connected to a shaft 86 as by a key 87. The shaft 86 extends through the forward wall of the headstock of the machine and is provided on its outer end with an operating member or lever 88, which is fixedly connected with the shaft 86. The hub of the link or arm 85 is split and the split portions are firmly clamped by a screw 89, the head of which abuts a boss or enlarged portion 90 provided on the portion 79 of the two-part link when the actuated mechanism is in the position illustrated in Fig. 7. It will be observed that in this position of the parts, which represents the work or stock-gripping position of the collet for stock of a minimum diameter within the tolerance limits, a line passing through the pivot 78 and the pivotal connection of arm or link 85 with the portion 79 of the two-part link passes through or slightly above the center of the shaft 86 thereby forming a toggle lock and locking lever 72 in operated or work-gripping position.

The pressure exerted by the lever 72, through the cone and other portions of the collet chuck, to effect gripping of the stock is determined by the force exerted by the spring 83, which may be varied by adjusting the threaded plug 84 within the bore provided in the lever 72. In order to accurately determine the force thus exerted, the said plug 84 has an enlarged knob portion 91 for gripping and rotating the plug, and attached to the knob 91 is an indicating arm 92 having an arrow or pointer 93 thereon. This arrow 93 cooperates with a series of indicia or calibrations 94 provided on a portion of the outer surface of the lever 72 and representing the force exerted by the spring 83 when the plug 84 has been adjusted to align the arrow or pointer 93 with the corresponding mark or indicium. As will readily be seen, the knob 91 may be rotated a number of turns to vary the compression of the spring 83 and thereby correspondingly vary the work-gripping pressure exerted by the collet chuck.

In operating this embodiment of the invention, the finger housing and the two-part link are adjusted to allow the toggle lock to close when stock having a diameter intermediate the range of tolerance limits is in the collet. The knob 91 is also adjusted to align the arrow 93 with an indicium 94 corresponding to the desired work-gripping pressure, this adjustment being made with the actuating mechanism in its open or inoperative position represented by the broken lines in Fig. 7. If a piece of stock of minimum diameter within the tolerance limits is now positioned in the collet and the actuating mechanism moved to its work-gripping position, the parts will take the positions illustrated in full lines in Fig. 7 with the rollers 25 of the fingers 22 resting high up on the conical surface 69. It will be observed that the arm 85 and the two-part link have effected a toggle lock, and that the force of the spring 83, exerted against the underside of the part 78 of the two-part link, acts through the toggle formed between this part and the link 77 to force the lever 72 in collet-closing direction. The cone or actuated part 68 is therefore held in work-gripping pressure by the yieldable force exerted by the spring 83, the amount of this force, and hence the work-gripping pressure, being determined by the adjustment of knob 91.

Figures 8, 9, 10:
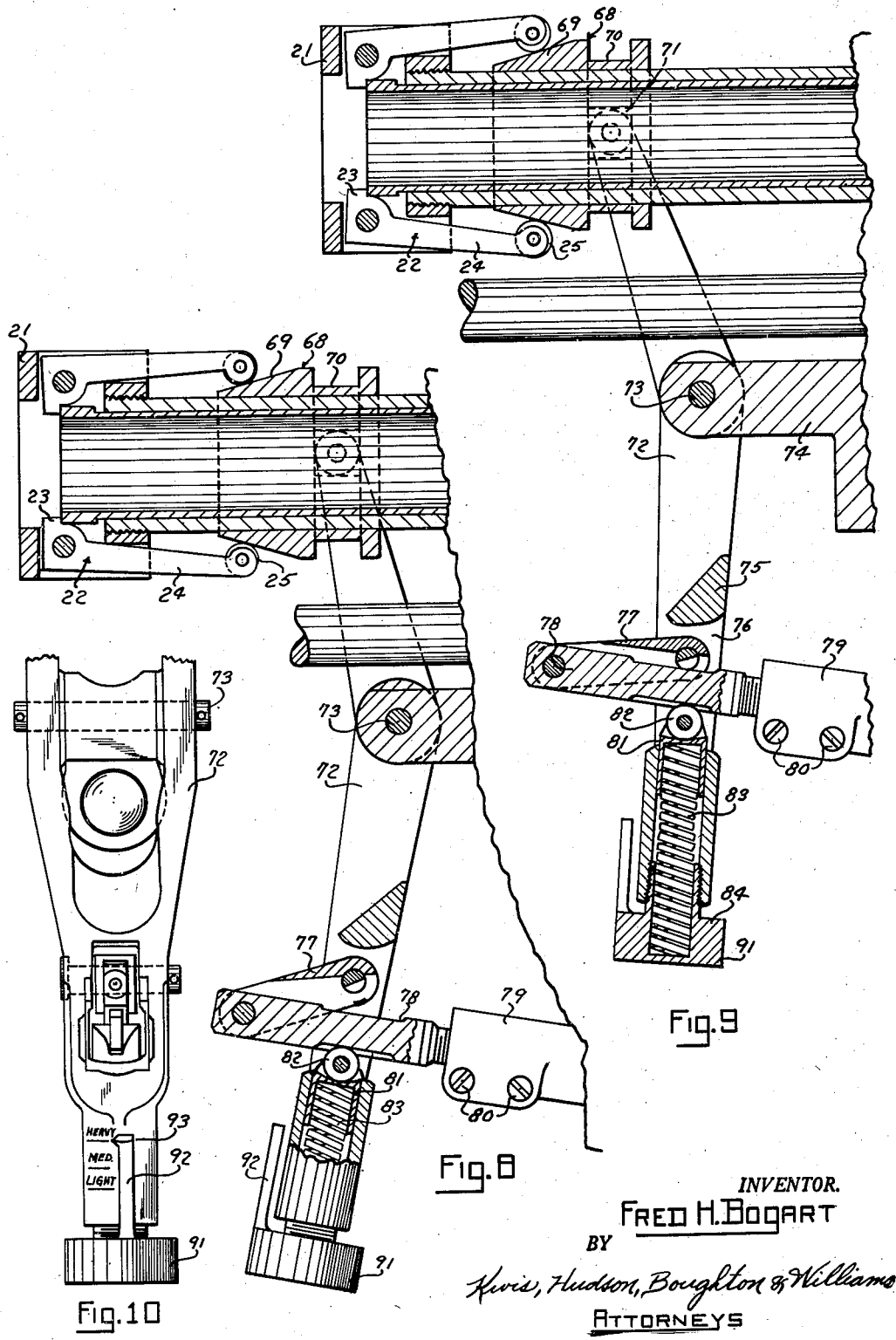
Fig. 8 (sheet 5) is a fragmentary view similar to Fig. 7 but showing the modified form of the improved actuating mechanism in work-gripping position for stock of maximum diameter within a range of limits.
Fig. 9 is a fragmentary view similar to Figs. 7 and 8 but showing the parts of the modified form of the improved actuating mechanism in their work-gripping positions for stock of intermediate diameter of a range of tolerance limits.
Fig. 10 is fragmentary side elemational view of the lower portion of the actuated lever of the mechanism illustrated in Figs. 7, 8 and 9.

Referring now to Fig. 8 of the drawings, a portion of the actuating mechanism is illustrated representing the positions of the parts when the work or stock gripped by the collet is of maximum diameter within the range of tolerance limits. In this instance, it will be seen that the rollers 25 on the fingers 22 engage the conical surface 69 of the actuated part 68 adjacent its smaller end and the said part is held in this position by the lever 72 under the force exerted by the spring 83 in the manner described above. Since the work or stock gripped is the maximum diameter within the tolerance limits, and since the finger mechanism was initially adjusted to allow the toggle lock to close with stock having a diameter intermediate the tolerance limits, the locking of the toggle formed between the arm 85 and the two-part link 78, 79 is now permitted by virtue of the fact that the portion 78 of the two-part link forces the roller 82 downward slightly against the action of the spring 83, the U-shaped link 77 swinging slightly about its pivot to permit this movement. Hence, when the work or stock varies in diameter, this relative movement of the two portions of the toggle, formed by link 77 and the part 78 of the two-part link, enables the lever 72 to actuate the cone in work-gripping direction with substantially a uniform force.

Figure 7:
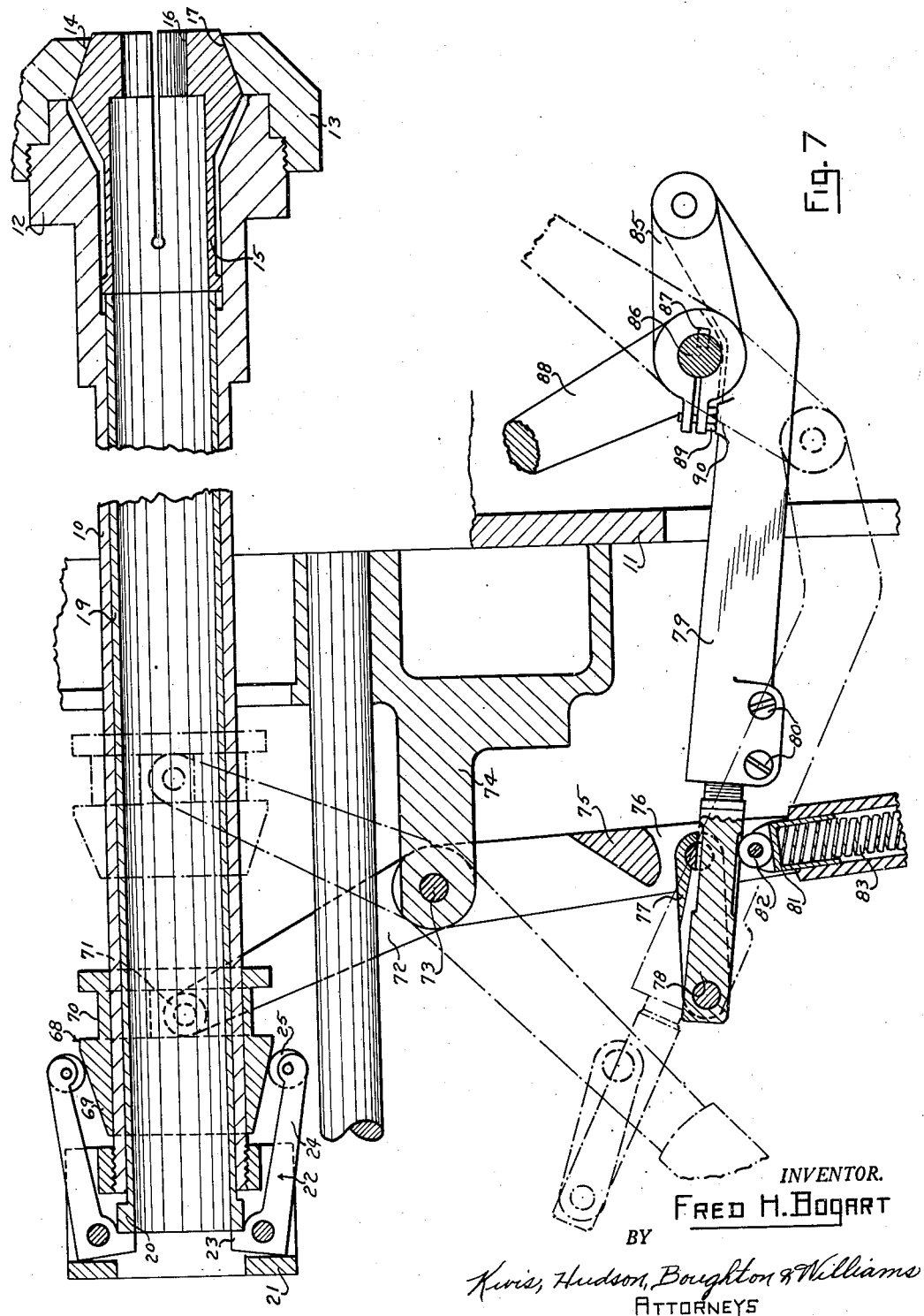
Fig. 7 (sheet 4) is a view similar to Fig. 1 but showing a modified form of the improved collet actuating mechanism, the parts thereof being indicated in full lines in their work-gripping positions corresponding to the presence of stock of minimum diameter within a certain range of tolerance limits in the collet chuck, the broken lines indicating the positions of the parts when the collet is open.

In Fig. 9 there is illustrated a collet chuck actuating mechanism of the type shown in Figs. 7 and 8 with the actuating mechanism in work-gripping position for stock of a size intermediate the range of tolerance limits. In this instance the relative movement that has occurred in the toggle formed by the link 77 and the portion 78 of the two-part link is less than the movement between these parts for the gripping of oversize stock as represented in Fig. 8. This relative movement in the toggle is in all cases, however, comparatively small and has been exaggerated in the drawings for the purpose of clarity of illustration. Since this relative movement is small, the force exerted upon the lever 72 is substantially the same for all diameters of stock within the tolerance limits.

It will now be appreciated that the improved collet chuck actuating mechanism of this invention provides a more efficient operation of a machine tool with which it is used since stock of various diameters may be firmly gripped with a uniform, predetermined pressure without the necessity of readjusting the mechanism for each piece of stock selected, and without danger of damage to the mechanism.

While a preferred embodiment and one modification of the invention have been described in considerable detail, it will be readily apparent that various changes may be made in the construction and arrangement of parts by one skilled in the art; and, therefore, it is to be understood that the invention is not limited to the exact constructions illustrated and described but only by the spirit and scope of the appended claims.

Having thus described my invention, I claim:

1. In the actuating mechanism of a work-gripping device having an actuated part and an operating member movable to and from a work-gripping position, an operative connection between said part and member including a lever and a plurality of interconnected elements operatively connected to said lever and said operating member for moving said actuated part to and from a work-gripping position, and means for applying a yieldable force to said lever for moving said lever to work-gripping position when said operating member is in its work-gripping position to permit work of various diameters within a predetermined range to be gripped with a substantially uniform gripping pressure proportional to the force exerted by said means, the said means comprising a stationary member, a sleeve slidably supported by said stationary member, means on said sleeve for pivoting said actuated lever thereon, and means cooperating with said stationary member and sleeve for exerting a force therebetween tending to move said sleeve relative to the stationary member.

2. The combination as defined in claim 1 and further comprising means for adjusting the position of said stationary member whereby the force exerted upon said sleeve and actuated lever may be adjusted to provide a range of work-gripping pressures.

3. An actuating mechanism for a collet chuck to effect chuck gripping of different sized work within a predetermined range and with substantially uniform pressure and comprising an endwise shiftable member having an exterior surface uniformly endwise tapered, pivoted collet actuating fingers cooperating with said tapered surface and rockable thereby during endwise shifting of said member to actuate said chuck to grip the work while said fingers are in contact with different portions of said tapered surface depending upon the particular sized work in said chuck; a pivoted actuated lever, means positively and directly operatively connecting said lever and said shiftable member, a rockable operating member movable to and from work gripping position, an arm connected to rock with said operating member, operative connections between said arm and lever and including a link pivotally connected at its ends to said arm and with said lever; said arm and said operative connections including said link being formed and pivotally interconnected to provide a toggle lock against movement of said operating member from work gripping position; and spring means operatively associated with said lever and said operative connections and exerting a predetermined force thereon when said operating member is in work gripping position and said toggle lock is effective and maintaining said shiftable member in work gripping shifted position with said fingers in contact with said uniformly tapered exterior surface thereof.

4. An actuating mechanism for a collet chuck as defined in claim 3 and wherein when said operating member is in work gripping position and said toggle lock is effective the axes of the pivotal connections between said link and said arm and between said operative connections and said lever are located in a line offset from and extending above the axis of said operating member.

5. An actuating mechanism for a collet chuck as defined in claim 3 and wherein movable means is provided which is pivotally connected to said actuated lever and forms the pivotal mounting for said lever while said spring means is operatively associated with said movable means and exerts a predetermined force thereon and on said lever when said operating member is in work gripping position and said toggle lock is effective and maintains said shiftable member in work gripping shifted position with said fingers in contact with said uniformly tapered exterior surface thereof.

6. An actuating mechanism for a collet chuck as defined in claim 3 and wherein the operative connections between said arm and said actuated lever include a link having one of its ends pivotally connected to said arm while said actuated lever is provided with an opening therethrough and extending longitudinally thereof, a second link is pivotally connected at one of its ends to said actuated lever within said opening and has its other end pivotally connected to the other end of said first named link, said actuated lever being provided with a longitudinal bore communicating with said opening, said spring means comprising a plunger slidable in said bore and having an operative association with said first named link, and a spring mounted in said bore and acting on said plunger to exert its force through said plunger against said link to maintain said lever in work gripping position with a predetermined pressure.

7. An actuating mechanism for a collet chuck as defined in claim 3 and wherein said operative connections between said arm and said actuated lever include a link having one of its ends pivotally connected to said arm, a second link having one of its ends pivotally connected to said actuated lever and its other end pivotally connected to the other end of said first named link, spring pressed means carried by said actuated lever and acting against said first named link, and means for varying the force exerted by said spring pressed means on said first named link in correlation to heavy, medium or light chuck gripping pressures on the work.

FRED H. BOGART.

REFERENCES CITED

The following references are of record in the file of this patent:

UNITED STATES PATENTS

| Number | Name | Date |
|---|---|---|
| 663,255 | Braun | Dec. 4, 1900 |
| 1,184,068 | Brophy | May 23, 1916 |
| 1,261,757 | Brophy | Apr. 9, 1918 |
| 1,389,975 | Parsons | Sept. 6, 1921 |
| 1,413,161 | Heald et al. | Apr. 18, 1922 |
| 1,758,844 | Long | May 13, 1930 |
| 1,956,272 | Church | Apr. 24, 1934 |
| 2,388,594 | Bogart | Nov. 6, 1945 |
| 2,440,926 | Bogart | May 4, 1948 |